April 9, 1957  W. REED-LETHBRIDGE  2,787,802
WIND SCREEN WIPERS
Filed July 20, 1953  2 Sheets-Sheet 1
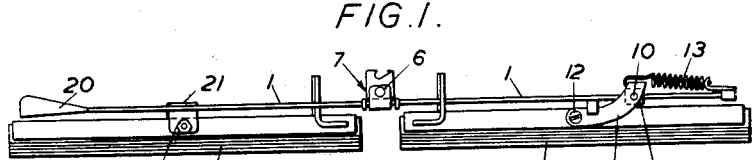
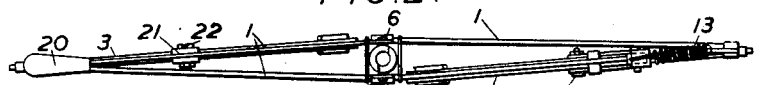
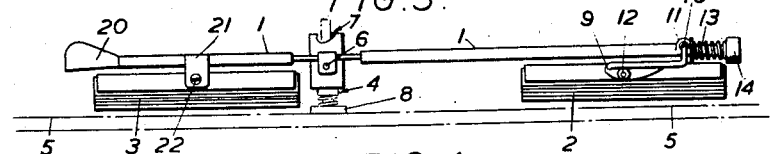
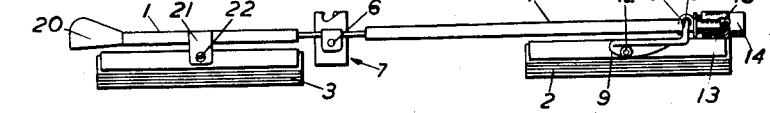
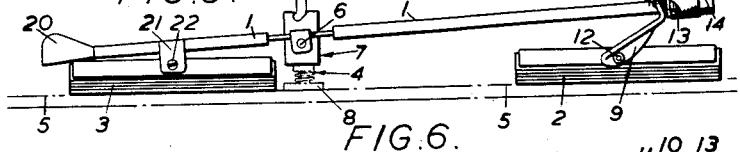
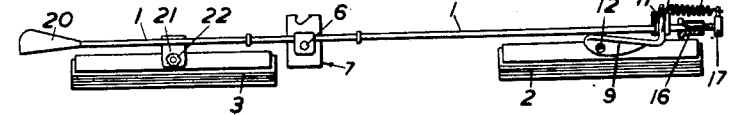
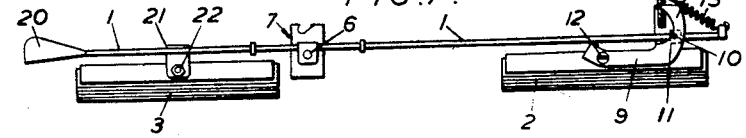
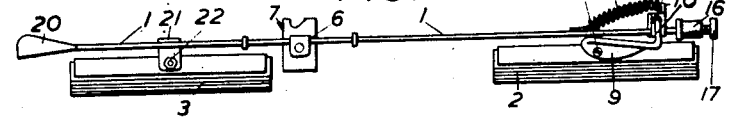
Inventor
W. Reed-Lethbridge
By
Attorneys

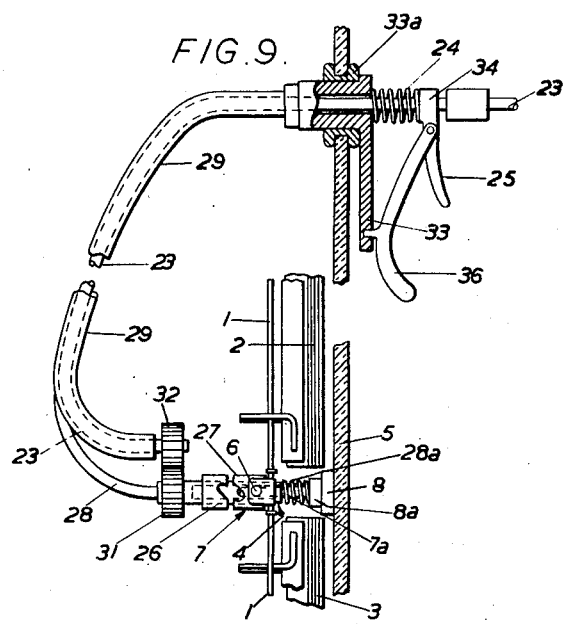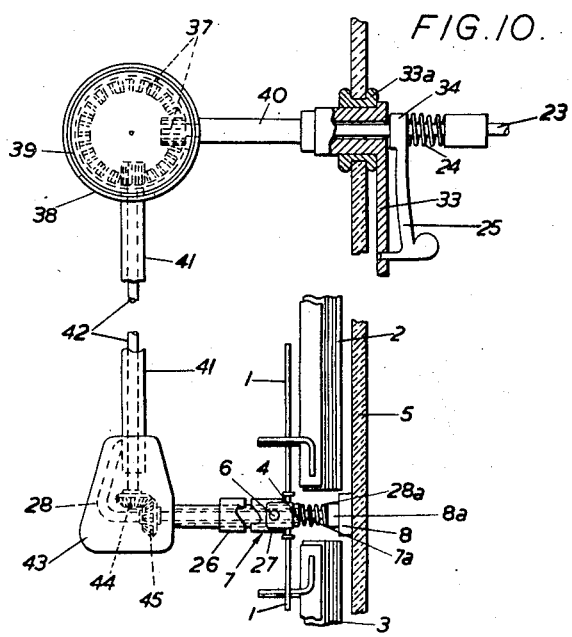

United States Patent Office 2,787,802
Patented Apr. 9, 1957

2,787,802

WIND SCREEN WIPERS

William Reed-Lethbridge, Brown's Bay, Auckland, New Zealand

Application July 20, 1953, Serial No. 369,105

Claims priority, application New Zealand July 28, 1952

14 Claims. (Cl. 15—250)

This invention relates to wind screen wipers used on wind screens of motor vehicles or on other flat surfaces for the purpose of cleaning or wiping off a wind screen or other flat surface, and in the case of a wind screen ensuring clear vision through the wind screen.

In known forms of wind screen wipers or wipers for flat surfaces, the wiper has been reciprocated in characteristic "wig-wag" wiper, and then again a rotary wiper has included a rod adapted to be rotated about a point of suspension, and a wiper blade supported by said rod in such a manner that it is capable of limited movement to and from and in planes parallel to the said rod, whereby when the rod is operated, the wiper blade is urged by centrifugal action towards the surface which is to be wiped.

This invention is concerned more particularly with the rotary form of surface wiper which makes provision for the blades to maintain wiping contact with the surface to be wiped, or to conform to the surface despite inequalities in or changes in position of the surface in relation to the rotary blades and their carrying rod owing to the latter not being set parallel to the surface to be wiped.

An object of this invention is to provide an improved form of rotary wind screen wiper wherein the wiping blades when in operation maintain a close wiping contact over a track, or over an inner track and an outer track on the surface despite inequalities in the surface in relation to the rod carrying the blades, and at the same time, avoiding any binding or seizing of the blades on the surface by excessive pressure of the blades on the surface through the centrifugal force brought about by the rotating blades. Hence the effect of the centrifugal force is by this invention limited in its action on the blades.

A still further object of this invention is to provide an improved form of rotary wind screen wiper in which the latter is operated through a drive capable of being brought into operation and disengaged and to ride without operating the wiper as required by an operator.

According to this invention the improved rotary wind screen wiper comprises a rod adapted to be rotated about a point of suspension, wiper blades carried by the said rod to wipe over a track or over inner and outer tracks on the surface of a wind screen, and said wiper blades being adapted, when the wiper is in operation, to be urged against the wind screen as the result of centrifugal action, and pre-setting and adjusting means for use in limiting the effect of the centrifugal action of the rotating blades so that as the rod carries the wiping blades, the latter adjust themselves to varying angles of inclination of the windscreen surface and with a limitation of pressure of the blades on the wind screen.

The invention will now be more particularly described with reference to the accompanying drawings, which illustrate by way of examples the different forms the improved wiper can take, but it is to be understood that the invention is not restricted to the specific forms indicated, as other forms can be employed without departing from the invention.

Therefore, in the accompanying drawings:

Figure 1 is an elevation of a form of the invention in which blades of equal length are pivotally carried on rods turning about a central point, one blade being connected to its rod by a spring influenced link, Figure 2 is a plan view of the invention according to Figure 1, Figure 3 illustrates by means of a similar view to Figure 1 a form of the wiper having blades of unequal length which follow inner and outer tracks and are pivotally mounted on rods turning about a central point, one blade being connected to its rod by a spring influenced link, a portion of the wind screen being shown in broken lines, Figure 4 is a view as in Figure 3 of the blade and its connection to the rod by a spring influenced link, and a presetting and adjusting means (broken away), Figure 5 shows the blade as in Figure 4 in operating position against a wind screen shown in broken lines, where centrifugal force has overcome the influence of the spring but the pivot of the blade is limited by the presetting and adjusting means, Figure 6 is a view as in Figure 3 of the blade and its connection to the rod by a spring influenced link, and another form of presetting and adjusting means (broken away), Figure 7 is a view as in Figure 3 of the blade and its connection to the rod by a spring influenced link, and another form of presetting and adjusting means (broken away), Figure 8 is a view as in Figure 3 of the blade and its connection to the rod by a spring influenced link, and yet another form of presetting and adjusting means, Figures 9 illustrates (in two parts), a form of drive to operate the rod through the flexible transmission, and Figure 10 illustrates (in two parts) another form of drive utilizing a gear transmission.

Referring to Figures 1 to 3 of the drawings, a rod 1 carrying the wiping blades 2, 3 is mounted so as to pivot on the point of suspension indicated at 4, and the wiping blades 2, 3 are pivotally connected with the rod 1 and act on the windscreen surface 5 at each side of the fulcrum 6 of the rod 1 on the point of suspension at 4, and where the blades 2 and 3 have inner and outer tracks as in Figure 3, with an inner blade 3 connected to the rod 1 nearer the fulcrum 6 than an outer blade 2; and means adapted to act under centrifugal action is provided to press the wiping blades 2 and 3 against the wind screen surface 5 by acting directly on the blades 2 and 3, and also by imparting pivotal movement to the blade carrying rod 1 while other means shown in Figures 4 to 7 limits the amount of pressure imparted by the blades 2 and 3 on to the surface 5.

In this invention, a wiper head 7 is adapted to be supported in close proximity to the wind screen surface 5 and to be rotated through a flexible or other suitable form of drive.

In the forms of the invention shown in Figures 1 to 3 a head 7 is fitted at one end with a button of rubber or other soft material 8 loosely attached to the head 7 so that when the head 7 is pressed towards the windscreen 5 by the wiper supporting and driving means shown in Figures 9 and 10, the button 8 bears against the windscreen surface and does not rotate, while permitting the head 7 to be rotated by the driving means.

The inner part of the head 7 may be spring influenced away from the button 8.

The blades 2, 3 each consists of rigid back and conventional rubber wiping material, extend on both sides of the head 7 as does also the blade carrying rod 1 which in the case where the blades 2 and 3 follow inner and outer tracks over the surface of the screen 5, is longer on one side of the head 7 than on the other side of the head 7. The rod 1 is pivoted to the head 7 so as to be capable of having rocking movement on the head 7. The blades 2 and 3 are pivotally connected with the rod 1, and where the blades 2 and 3 follow inner and outer tracks as shown in Figure 3 the longer part of the rod 1 carries an outer blade 2 which follows an outer track, while the shorter part of the rod 1 carries an inner blade 3 which follows an inner track on the surface being wiped. Hence in one form of the invention, the blades 2 and 3 when in use follow separate tracks, but by adjusting the position of the blades 2 and 3 on the rods 1, the blades 2 and 3 can be arranged to follow overlapping tracks if desired. Furthermore, if desired, a blade 3 can be shortened to form merely a counter for a large blade 2.

As shown in all forms of this invention the blade 2 is pivoted to the rod by a link 9 and such link 9 is in the form of a stirrup see Figures 1 and 2 with two conjoined arms which may be angular in formation with each arm fitted to incline outwards from its pivotal point at 10 made by bearing 11 and then inwards towards the head 7 and pass along the back of the blade 2 on that end of the rod 1 and the arms end in a pivotal connection 12 with the back of the blade 2.

A spring 13 is associated with the rod 1 to influence the link 9 to turn the latter and draw the blade 2 towards the rod 1 so that while the blade 2 is stationary, it is held away from the glass or surface to be wiped. As shown in Figures 1 and 2 the spring 13 is a coil spring affixed between the end of the rod 1 and the outer end of the link 9. In Figures 3 and 4 the spring 13 is accommodated on the rod 1 and is held up to the end of the link 9 by a nut 14 or housing 15 see Figures 4 and 5 threaded on the end of the rod 1. In Figures 6 and 7 the spring 13 is as in Figure 1.

As shown in Figure 8 the spring 13 is a spring under compression to influence the link 9 to return the blade 2 on to the rod 1.

One side of the rod 1, or the outer end of the longer part of the rod 1, is arranged to support a presetting and adjustable means adapted to limit the pivoting of the link 9 as the rod 1 is rotated about the head 10. As shown in Figure 4 such presetting and adjustable means is in the form of an adjustable stop made by housing 15 which can be brought to and held at a position by a nut 14 whereby the link 9 bears against the stop and the link 9 is limited in movement, see Figure 5.

In a simple form of presetting and adjustable means as shown in Figures 6 and 8 one end of the rod 1, or the outer end of the longer part of the rod 1 is screw threaded and a collar or nut 16 is threaded on to the rod 1 for the link 9 to bear against; and where the link 9 is of angular formation, the collar or nut 16 is adjusted on the rod 1 so that it bears against the angle of the arms of the link 9. A back nut 17 can be threaded on the rod 1 to lock the collar or nut 16 in a desired position to attain a desired adjustment and limiting effect. As shown in Figure 7 the presetting and adjusting means is provided by an extension 18 of the link 9 having a bolt 19 adapted to screw in and towards the end of the rod 1 to limit the pivotal relationship between the link 9 and the rod 1.

In order to ensure sufficient centrifugal action as the rod 1 and blades 2 and 3 are turned on head 7, the outer ends of the rod 1 are provided with weights 20, the better to create centrifugal action, and if desired one weight 20 only is situated on one end of the rod 1. Where the rod 1 has a long and short part, the weight 20 on the short part of the rod 1 may be weighted to counterbalance the length and the greater weight of the long part of the rod 1 and its blade 2 together with the presetting and adjusting means of blade 2 and, at the same time, to ensure that the blades 2 and 3 particularly their outer ends, are pressed on to the surface to be wiped when the wiper is rotated at high speed.

The blade 3 attached to the short part of the rod 1 is held by an inverted U support 21 and pivotally attached by a pin or screw 22.

The wiper head 7, according to this invention, is arranged to be connected with a driving means operated from a source of power such as an electric motor. As illustrated in the drawings, Figure 9 shows a flexible drive, while Figure 10 shows a drive through planetary gears and shafts.

In Figure 9 of the drawings the drive is connected to the head 7 of the wiper by a flexible connection 23 adapted to be moved lengthwise against the influence of a spring 24 when released by a positioning lever 25, to effect a driving connection by ratchet 26 engaging in ratchet 27 on the head 7. In this arrangement the head 7 has a central stub shaft 7a with one end attached to the button 8 and the outer free end telescoping into a central support 28 having its outer end attached to a housing 29 of the flexible connection 23. The inner end of the central support 28 is pressed outwards by a spring 28a situated between its inner end and a collar 8a attached to the stub shaft 7a. Such spring 28a telescopes the central support 28 outwards and parts the ratchets 26 and 27 when the wiper is not in use. The ratchet 26 is free to turn and to slide on the central support 28 and by its gear wheel 31 meshed with the gear wheel 32 of the flexible connection 23, the ratchet 26 can be moved along the support 28 to engage with the ratchet 27 as the flexible connection 23 and housing 29 are lengthened. In order to lengthen or shorten the flexible connection 23 and housing 29, a plate 33 has a bushing 33a passed through the windscreen and a collar 34 is movable against the spring 24 by operating the positioning lever 25 after the lever 36 has been released from plate 32.

As shown in Figure 10 of the drawings, the drive is connected to the head 7 of the wiper through planetary gears 37 housed in a slotted casing which is made in two sections 38 and 39 slidable on each other and section 38 extends as a tube 40 through the bushing 33a of the plate 33, and the tube 40 is extendable by operating the positioning lever 25 as before. The section 39 extends as another tube 41 with a driven shaft 42 therein connects with a housing 43, and a bevel gear 44 on the shaft 42 meshes with another bevel gear 45 in the housing 43. The central support 28 carries turnably and slidably the ratchet 26 which has the bevel gear 45 meshing with the bevel gear 44. Hence by the arrangement shown in Figure 10 the positioning lever 25 is operated to shorten the tube 40 and by so doing the tube 41 is drawn towards the head 7 as the central support 28 telescopes on the stub shaft 7a of the head 7.

Hence by this invention a wiper for a surface such as a wind screen is turned by a flexible or other drive connected to the head 7, and rotation of the head 7 carrying the rod 1 and its blades 2, 3 sets up centrifugal action which causes the link 9 to pivot in bearing 11 and to carry blade 2 outwards and into contact with a surface 5 to be wiped until the link 9 is limited in its further movement by the presetting and adjusting means such as nut 14 or housing 15 and at the same time the rod 1 pivots on the head 7 to bring the other end of the rod 1 towards the surface 5 and to force the other blade 3, also under the effect of the centrifugal force on to the surface 5 to wipe the latter efficiently without seizing on the surface 5.

What I do claim and desire to obtain by Letters Patent of the United States of America is:

1. A rotary windscreen wiper comprising a rod adapted to be rotated about a point of suspension intermediate its ends, wiper blades carried by the rod at each end to wipe over a circular area on the surface of a screen, said wiper blades being adapted, when the wiper is in operation, to be urged against the windscreen as the result of centrifugal action, wherein the rod is mounted so as to be capable of pivoting on the point of suspension about an axis transverse to the axis of said rod, one of said wiping blades being connected by a pivot on one side of the point of suspension and the other one of the wiping blades being connected by a link influenced by a spring which draws the blade towards the rod while the blade is stationary and, the influence of the spring being overcome by centrifugal action while the blade is rotating round the point of suspension.

2. A rotary windscreen wiper as claimed in claim 1 wherein the spring is a coil spring affixed between the end of the rod and the outer end of the link.

3. A rotary windscreen wiper as claimed in claim 1 wherein the spring is accommodated on the rod and is held up to the end of the link by a nut or housing threaded on the end of the rod.

4. A rotary windscreen wiper as claimed in claim 1 wherein the spring is under compression to influence the link to return the blade on to the rod.

5. A rotary windscreen wiper as claimed in claim 1 wherein the link connecting one wiper blade to the rod is in the form of a stirrup with conjoined arms having an angular formation and with each arm inclined outwards from its pivotal point in a bearing on the rod and then the arms incline inwards towards the point of suspension of the wiper to join the back of the blade by a pivotal connection.

6. A rotary windscreen wiper as claimed in claim 1 wherein a presetting and adjusting means is provided comprising an adjustable stop which can be brought to and be held in position by a nut whereby the link bears against the stop and the link is limited in movement away from the rod and towards the windscreen.

7. A rotary windscreen wiper as claimed in claim 6 wherein the adjustable stop is formed by a housing which accommodates the spring influencing the link, and the housing is threaded on the rod and held thereon by a back nut.

8. A rotary windscreen wiper as claimed in claim 6 wherein the presetting and adjusting means is on one end of the rod which is screw threaded, and a collar or nut is threaded on such screw threaded end of the rod for the link to bear against.

9. A rotary windscreen wiper as claimed in claim 6 wherein the presetting and adjusting means comprises a bolt adapted to screw in through an extension of the link on to the end of the rod to limit the pivotal distance of the link on the rod.

10. A rotary windscreen wiper as claimed in claim 1 wherein the rod has a weight or weights near one or both ends the better to create centrifugal effect.

11. A rotary windscreen wiper as claimed in claim 2 wherein the rod is adapted to be rotated by a drive connected to the head to rotate the head and the rod and the blades to set up centrifugal effect to cause the link to pivot outwards to bring the blades into contact with the surface to be wiped until the link is limited in its further movement by the presetting and adjusting means.

12. A rotary windscreen wiper as claimed in claim 11, wherein the drive connected to the head of the wiper is by a flexible connection adapted to be moved lengthwise under the influence of a spring when released by a positioning lever to effect a driving connection with the head of the wiper for rotating the latter.

13. A rotary windscreen wiper as claimed in claim 11 wherein the drive connected to the head of the wiper is by planetary gears in a slotted casing adapted under the influence of a spring to effect a driving connection through shafts and bevel gears with the wiper to rotate the latter when a positioning lever is released.

14. A rotary windscreen wiper as claimed in claim 6 wherein a weight is provided on the end of the rod opposite to the end carrying the adjustable stop to counterbalance the greater weight of its blade together with its presetting and adjusting means.

References Cited in the file of this patent

UNITED STATES PATENTS

| 1,920,144 | Hueber | July 25, 1933 |

FOREIGN PATENTS

| 222,225 | Great Britain | Oct. 2, 1924 |
| 514,282 | Great Britain | Nov. 3, 1939 |